Nov. 16, 1937.   H. O. HEM   2,099,562
DEVICE FOR MAINTAINING THE CONDITION OF LEVEL OF SUPPORTS
Filed Jan. 16, 1936   3 Sheets-Sheet 1
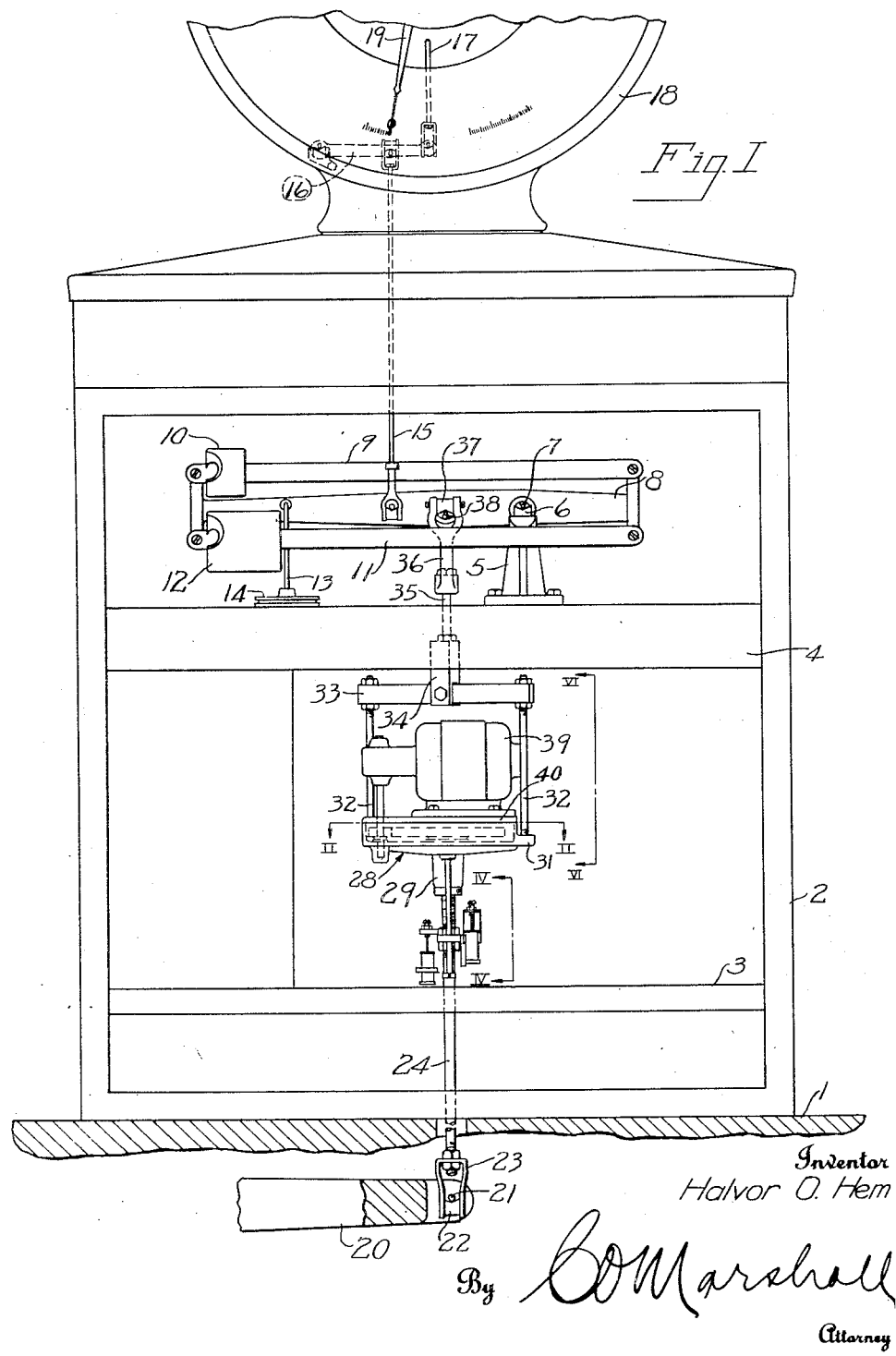
Fig. I
Inventor
Halvor O. Hem
By C O Marshall
Attorney

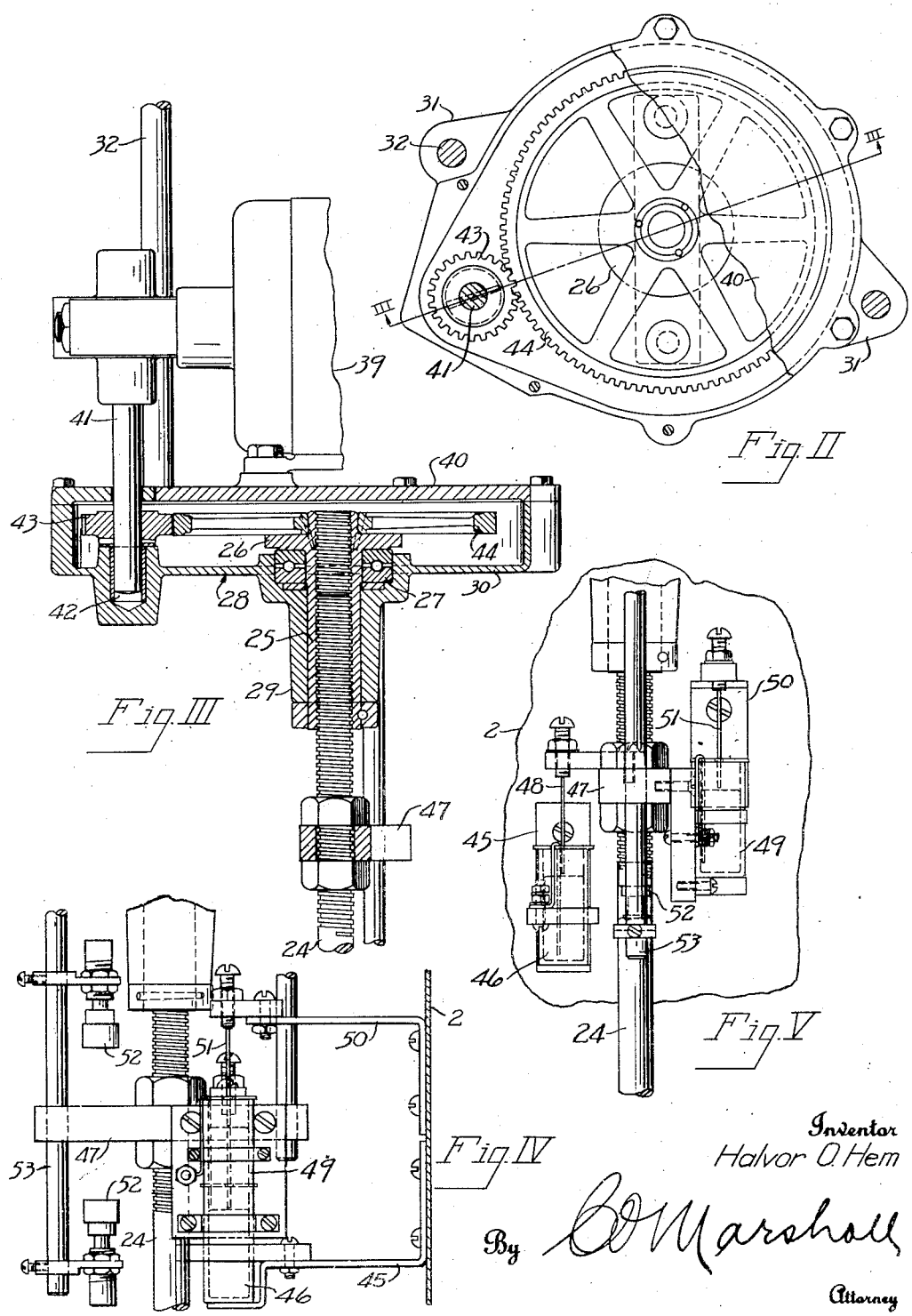

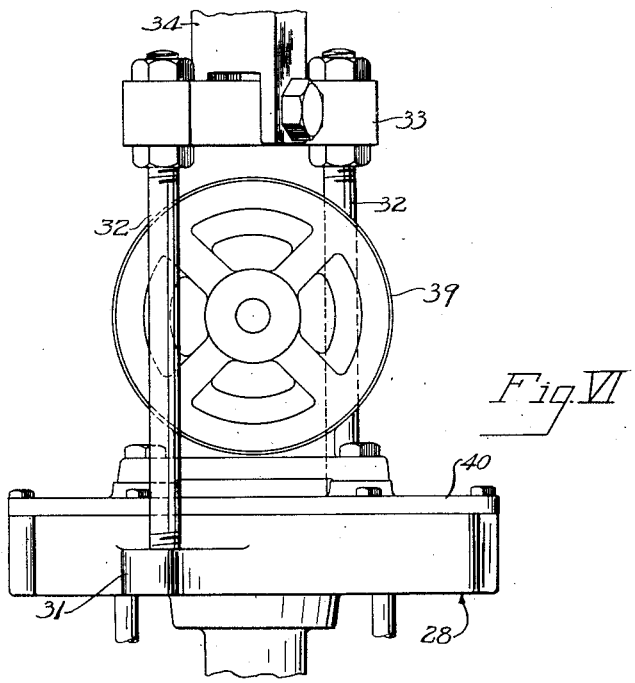
*Fig. VI*
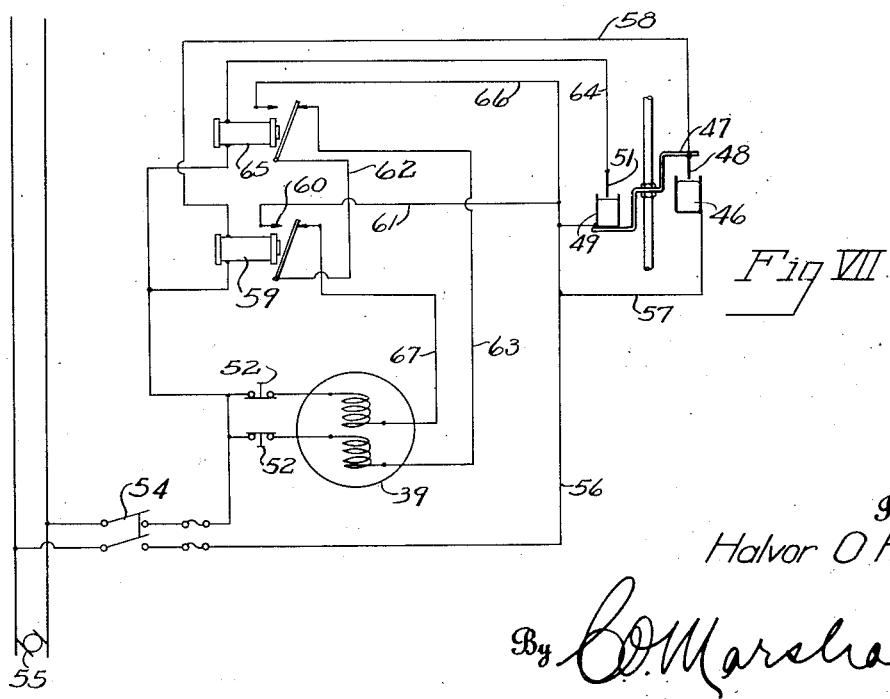
*Fig. VII*
Inventor
Halvor O. Hem
By C.O. Marshall
Attorney Patented Nov. 16, 1937

2,099,562

UNITED STATES PATENT OFFICE 2,099,562

DEVICE FOR MAINTAINING THE CONDITION OF LEVEL OF SUPPORTS

Halvor O. Hem, Toledo, Ohio, assignor to Toledo Scale Manufacturing Company, Toledo, Ohio, a corporation of New Jersey Application January 16, 1936, Serial No. 59,388

6 Claims. (Cl. 265—27)

This invention relates to load supports, and particularly to devices for maintaining the condition of level of supports which are subjected to deflection or displacement under varying loads.

Weighing scale platforms which support large tanks are forced downwardly as the tanks are filled, thus setting up stresses in such pipes and connections as are secured to the tanks and transferring part of the load to such pipes and connections. The results of such transfers of loads are to render inaccurate the weighing scale indications and to make the pipe fittings difficult to connect and disconnect and to cause liability to leakage and breakage. This invention, however, is not limited to improvements in weighing scales. Even framework supporting large tanks erected on rigid foundations may spring downwardly as the tanks are filled and subject piping and fittings to displacement and strains that make the fittings difficult to connect and disconnect and cause liability to leakage and breakage. This invention has for its principal object the provision of means to compensate for the effects of displacement under load.

Other objects and advantages will be apparent from the following description, in which reference is had to the accompanying drawings illustrating a preferred embodiment of my invention and wherein similar reference numerals designate similar parts throughout the several views.

In the drawings:—

Figure I is a front elevational view showing the device of this invention incorporated in lever mechanism of an automatic weighing scale, a cabinet having a beam lever fulcrumed therein, and a fragment of a load-receiver supporting lever and a fragment of an indicating dial being shown;

Figure II is an enlarged fragmentary plan view taken substantially on the line II—II of Figure I, parts being broken away and parts in section;

Figure III is a sectional elevational view taken substantially on the line III—III of Figure II, a fragment of an electric motor also being shown;

Figure IV is a fragmentary side elevational view taken from the position indicated by the line IV—IV of Figure I;

Figure V is a front elevational view showing substantially the same parts as are illustrated in Figure IV;

Figure VI is a fragmentary side elevational view taken from the position indicated by the line VI—VI of Figure I; and Figure VII is a diagram indicating the electrical apparatus and circuits employed in the device.

Referring to the drawings in detail, a deck 1 supports a cabinet 2 which contains shelves 3 and 4. Secured upon the shelf 4 is a fulcrum stand 5 upon which is mounted a bearing 6 that is engaged by a knife-edged pivot 7 fixed to the beam lever 8. The beam lever 8 carries a tare beam 9 and tare poise 10 and a capacity beam 11 and capacity poise 12. The beam lever is connected by means of a plunger rod 13 to a dashpot 14 and by means of a tension rod 15 to a short lever 16 which, in turn, is connected by means of a tension rod 17 to automatic load-counterbalancing mechanism (not shown) which is mounted within a dial housing 18 and operatively connected to an indicating hand 19.

Extending to a point beneath the deck 1 is the end of a load-receiver supporting lever 20, which may be connected to a platform, a hopper, a tank or other load-receiver (not shown). Fixed to the end of the load supporting lever is a knife-edged nose pivot 21 which engages a bearing 22 hung in a loop 23, the loop being fastened to the lower end of a rod 24.

The upper end of the rod 24 is threaded, and screwed into its upper end is an internally threaded sleeve 25 having a flange 26 which rests upon the upper member of a ball race 27, the lower member of the ball race being supported within a housing 28. The housing 28 has a depending tubular portion 29, which surrounds the sleeve 25, and a pan-like portion 30 having horizontally extending ears 31 on opposite sides.

Fixed into the ears 31 are the lower ends of rods 32, the upper ends of which are fixed to the ends of a crossbar 33. The crossbar 33 is supported at its center by a block 34 which is hung, by means of a rod 35, from a stirrup 36 having bearings 37 that rest upon the load pivot 38 of the beam lever 8.

If a load be applied to the lever 20, the load will be transmitted through the rod 24, the sleeve 25, the housing 28, the rods 32, the crossbar 33 and the rod 35, and their connections, to the beam lever and thence through the rod 15, the short lever 16 and the rod 17, to the automatic load-counterbalancing mechanism (not shown). Movement of the automatic load-counterbalancing mechanism is transmitted to the indicating hand 19, which moves over the dial to indicate the weight of the load.

In order to compensate for downward movement of the load-receiver as the weighing mechanism moves to load-counterbalancing position, the sleeve 25 is screwed downwardly upon the rod 24 by means of a motor 39 which is mounted upon a cover plate 40 secured upon the housing 28. The motor 39, acting through suitable speed-reducing gearing (not shown), turns a vertical shaft 41 which is journaled in a socket 42 in the housing 28. Fixed upon the vertical shaft 41, near its lower end, is a pinion 43 which meshes with a gear 44 that is keyed to the sleeve 25 above the flange 26.

Fixed to the rear wall of the cabinet 2 is a bracket 45 by which is carried a cup 46 containing mercury, and mounted upon the rod 24 is a fixture 47 from which projects downwardly a contact member 48 that normally is held with its end just out of contact with the mercury in the cup 46 when the load-receiver, the lever 20 and the rod 24 are in proper condition of level. Carried by the fixture 47 is a second cup 49, also containing mercury, and fixed to the rear wall of the cabinet 2 is a second bracket 50 from which projects a contact member 51, the mercury in the second cup 49 normally being held with its upper surface just out of contact with the lower end of the contact member 51 when the load-receiver, the lever 20 and the rod 24 are in proper condition of level.

In order to prevent damage to the device in case the sleeve 25 should travel to its limit of movement on the rod 24, limit switches 52 are mounted upon a rod 53 which depends from the housing 28, the limit switches being mounted in position to be engaged by the fixture 47 when the sleeve 25 approaches its limit of movement on the rod 24.

Operation

As the load upon the load-receiver increases when, for example, liquid flows into a load-receiving tank or granular material flows into a load-receiving hopper, the lever 20 is forced downwardly, but a very slight downward movement of the lever 20 and the rod 24 carries the contact member 48 into contact with the mercury in the cup 46. By reference to Figure VII it will be seen that, if the switch 54 be closed, current from a source of supply 55 will pass through the wires 56 and 57 to the cup 46 and thence through the mercury and contact 48 and a wire 58 to a relay 59, whereupon a circuit will be closed at 60 and current will pass through the wire 56 and wires 61, 62 and 63 to the forward winding of the reversible motor 39, causing the motor to turn the sleeve 25 in a direction to raise the rod 24 and lever 20, thus immediately restoring the condition of level of the load-receiver. The inertia of the motor causes it to rotate to an extent sufficient to lift the contact member 48 clear of the mercury in the cup 46 but not sufficient to lift the mercury in the cup 49 into contact with the contact member 51. When the contact member 48 is lifted clear of the mercury in the cup 46, the relay 59 is de-energized and the motor is permitted to come to a stop.

When the load-receiver is being unloaded, the rod 15, beam lever 8, rods 35 and 32, the rod 24, the lever 20 and the load-receiver are pulled upwardly by the action of the load-counterbalancing mechanism. As the rod 24 moves upwardly the mercury contained in the cup 49 is raised into contact with the contact member 51, current will pass from the wire 56 through the wire 64 to a relay 65, which thus will be energized to close a circuit through a wire 66, the wire 62 and a wire 67 to the reverse winding of the motor 39. The current supplied through the contact member 51 and the relay 65 will cause the motor to turn the sleeve 25 in a direction to lower the rod 24 and lever 20, thereby keeping the condition of level of the load-receiver substantially unchanged as the load is withdrawn.

The embodiment of my invention herein shown and described is to be regarded as illustrative only, and it is to be understood that the invention is susceptible to variation, modification and change within the spirit and scope of the subjoined claims.

Having described my invention, I claim:

1. In a device of the class described, in combination, a load-supporting lever, load-counterbalancing mechanism, means connecting said lever to said load-counterbalancing mechanism, and automatic means for changing the length of said connecting means to restore said lever to substantially its original position as such load-counterbalancing means is displaced under load.

2. In a device of the class described, in combination, a member subject to displacement effects under load, load-counterbalancing mechanism, means connecting said member to said load-counterbalancing mechanism, and automatic compensating means for substantially compensating for such displacement effects and thereby restoring said member to substantially its original position, said compensating means including means acting upon said connecting means for exerting an upward pull on said member, electric circuits for activating said pull-exerting means and means for closing said circuits when said member is subjected to displacement effects.

3. In a device of the class described, in combination, a member subject to downward displacement effects under load, load-counterbalancing mechanism, means connecting said member to said load-counterbalancing mechanism, and automatic means acting upon said connecting means for elevating said member and thereby substantially compensating for such displacement effects, said compensating means including means for exerting an upward pull on said member, electric circuits for activating said pull-exerting means and means for closing said circuits when said member is subjected to displacement effects.

4. In a device of the class described, in combination, a member subject to downward displacement effects under load, load-counterbalancing mechanism, means connecting said member to said load-counterbalancing mechanism, and automatic means acting upon said connecting means for elevating said member and thereby substantially compensating for such displacement effects, said compensating means including means for exerting an upward pull on said member, electric circuits for activating said pull-exerting means and means for closing said circuits when said member is subjected to displacement effects, said pull-exerting means including a motor and motion reduction gearing.

5. In a device of the class described, in combination, a load-supporting lever, load-counterbalancing mechanism, means connecting said lever to said load-counterbalancing mechanism, and automatic means for changing the length of said connecting means and thereby restoring said lever to substantially its original position as such load-counterbalancing mechanism is displaced under load, said automatic means including an electric motor, motion reduction gearing connecting said motor to said lever and means for activating said motor when said lever is forced downwardly under load.

6. In a device of the class described, in combination, a member subject to downward displacement effects under load, load-counterbalancing mechanism, means connecting said member to said load-counterbalancing mechanism, and automatic means for elevating said member and thereby substantially compensating for such displacement effects, said compensating means including means for exerting an upward pull on said member, electric circuits for activating said pull-exerting means and means for closing said circuits when said member is subjected to displacement effects, said pull-exerting means including a motor, motion reduction gearing and means for activating said motor in a reverse direction when said lever is permitted to move upwardly by decrease in load.

HALVOR O. HEM.